No. 891,975. PATENTED JUNE 30, 1908.
I. K. BEAVER.
VALVE.
APPLICATION FILED FEB. 12, 1907.
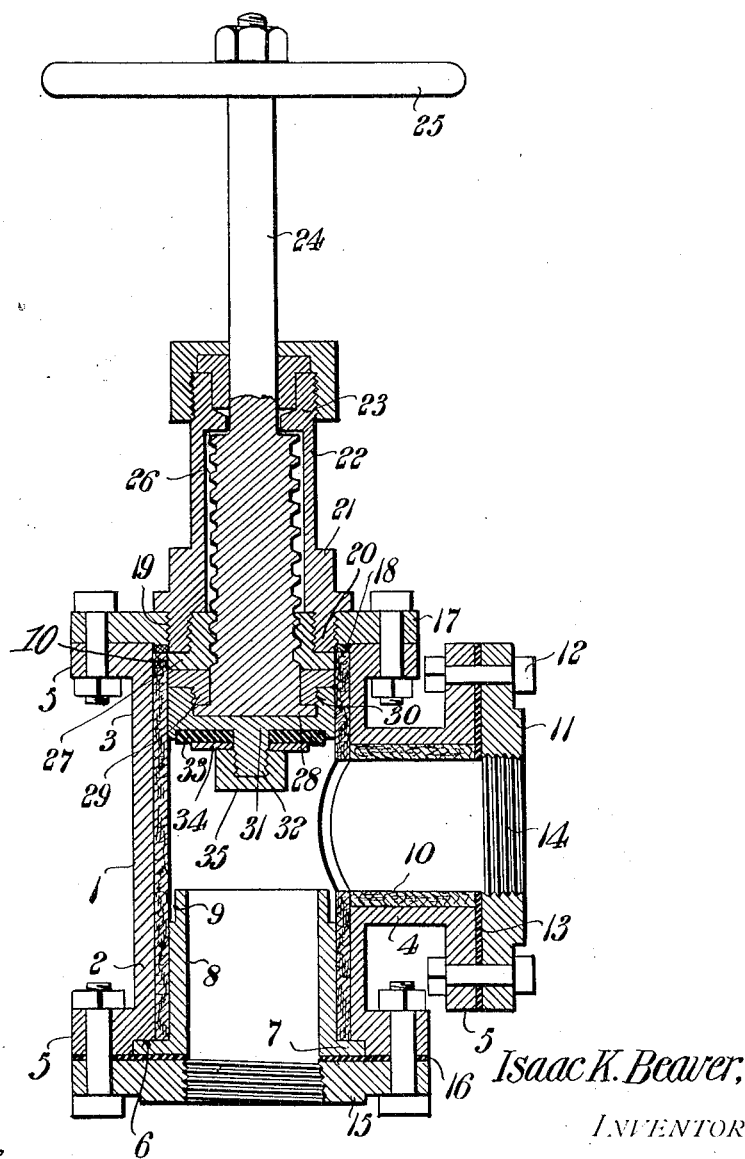
Isaac K. Beaver,
INVENTOR
By C. A. Snow & Co.
ATTORNEYS
WITNESSES:

UNITED STATES PATENT OFFICE.

ISAAC K. BEAVER, OF WILBURTON, PENNSYLVANIA.

VALVE.

No. 891,975.　　　　Specification of Letters Patent.　　　Patented June 30, 1908.

Application filed February 12, 1907. Serial No. 357,021.

*To all whom it may concern:*

Be it known that I, ISAAC K. BEAVER, a citizen of the United States, residing at Wilburton, in the county of Columbia and State of Pennsylvania, have invented a new and useful Valve, of which the following is a specification.

This invention relates to valves for use in pipe lines through which mineral waters and the like are conducted.

The primary object of the invention is to provide a valve having a lining which can be readily inserted thereinto or removed therefrom and which will protect the interior of the valve from the action of the liquid contents of the valve.

Another object is to provide a detachable valve seat which is held in place without the necessity of screw threading the seat and the casing, which threads are objectionable because of the fact that they corrode when subjected to the action of certain mineral waters and prevent the removal of the seat.

A still further object is to provide a valve which can be readily removed from the casing, the same being provided with a feed nut which is held in place within the casing without the necessity of threading either the casing or the nut.

A still further object is to provide a seat which is so located as to be conveniently dressed or repaired without the necessity of removing it from the casing.

With these and other objects in view the invention consists of certain novel features of construction and combinations of parts which will be hereinafter more fully described and pointed out in the claims.

In the accompanying drawing which is a section through the valve, the preferred form of the invention has been shown.

Referring to the drawing 1 is a valve casing formed of any suitable material such as cast iron and T-shaped so as to form arms 2, 3 and 4. The outer end of each of these arms is surrounded by an annular flange 5 formed with a plurality of openings for the reception of securing bolts and the outer end of the arm 2 is countersunk as at 6 to receive an annular flange 7 formed at the outer end of the tubular valve seat 8. The inner end of this valve seat is reduced annularly as shown at 9. A lining 10 of wood or other material capable of resisting the action of the liquid contents of the valve is placed within the casing and the arms thereof, this lining being interposed between the valve seat 8 and the arm 2. The lining may be made in any desired number of pieces the only requirement being that the same is capable of being inserted into the casing from the open ends of the arms 2, 3 and 4 thereof. That portion of the lining within the arm 4 is held against displacement by a ring 11 which is clamped upon the flange 5 of said arm by bolts 12. A gasket 13 is preferably interposed between the ring and the arm and lining and the wall of the aperture within the ring is preferably screw threaded as shown at 14 so as to engage the threaded end of a pipe. The valve seat 8 is held within the arm 2 by a ring 15 similar to the ring 11 and this is bolted to the flange 5 of said arm and has a gasket 16 interposed between it and said flange. As the flange 7 of the valve seat overlaps one end of the lining said lining is prevented thereby from moving in one direction. Movement of the lining in the opposite direction through the arm 3 is prevented by a ring 17 constituting the valve lid and which is bolted to the flange of arm 3. A gasket 18 of lead or of other soft metal is interposed between this ring and the adjoining end of the lining 10. The wall of the opening within the lid 17 is screw threaded as shown at 19 and receives a circular flange 20 extending from one end of the bonnet 21 of the valve. This bonnet has a smooth bore 22 provided at one end with a gland 23 through which extends a stem 24. A wheel 25 is secured upon the outer end of this stem while that portion thereof normally within the bonnet is enlarged and screw threaded as shown at 26. The threaded portion of the stem extends through and engages a feed nut 27 which engages the interior threads of the flange 20 and laps the end of said flange. The inner end of the stem 26 is enlarged annularly to form a head 28 and the thread on the stem terminates short of this head so that a smooth surface is produced capable of rotating within a nut 29 having an inwardly extending and externally screw threaded circular flange 30 against which the head abuts. This flange is screwed into a recessed disk 31 constituting a seat for the head 28 and extending from the center of the disk is a screw threaded stud 32. This stud projects through the center of a rubber disk 33 and a metal disk 34, said disks being clamped tightly against the recessed disk 31 by means of a cap nut 35.

It will be apparent that by removing the ring 11 and either or both of the rings 15 and 17 the lining which has been first properly shaped can be inserted into the casing after which the seat 8 is inserted and the rings 11 and 15 bolted in place. The parts constituting the stem, feed, and holder are then assembled as shown and inserted into the arm 3, the ring 20 of the bonnet being screwed into the ring 17. After the parts have been put together in this manner the disk 28 of the valve can be lowered against the valve seat 8 simply by rotating the stem 24. This will cause the threads on said stem to work within the feed nut 27 and the head 28 to rotate within the recessed disk 31. Said disk and the nut 29 will move longitudinally with the stem and its head but said head is free as heretofore stated to rotate between them. The lining of the valve is preferably formed of wood although any other desirable material may be used in lieu thereof. Those parts of the valve which are exposed to the action of the liquid contents thereof, such as cap nut 35, disks 34 and 31 and seat 8 are preferably made of a metal which will be but slightly if at all affected by the liquid. The nature of these materials will of course depend upon the character of the liquid to pass through the valve. Should the valve seat become worn through constant use the same can be repaired without the necessity of removing it simply by detaching the lid 17 and lifting it and the parts connected thereto from the casing. A suitable seat grinding tool can then be inserted into the casing and the dressing of the seat can be readily effected because of the fact that the same is reduced in thickness as shown at 9. Although rings 11 and 15 have been shown clamped upon the casing it is to be understood that where cast iron pipes are used the flanges of the pipes can be substituted for these rings. It will be seen that all of the parts of the valve can be very readily replaced in the event of wear or breakage and as the lining of the casing is the only part of said casing subjected to the action of the contents of the valve it will be apparent that the life of the body of the casing will be greatly prolonged.

What is claimed is:

1. The combination with a casing having a smooth straight bore therein, a valve seat detachably mounted in one end of said bore, and means for holding said seat against displacement; of a lid clamped upon the casing at the other end of the bore, a bonnet detachably connected to and extending into the lid, a feed nut detachably secured within and extending across the feed end of the bonnet, a stem revolubly mounted within the bonnet and having a threaded portion engaging the feed nut, said stem having a head at one end, a recessed disk constituting a seat for said head, a retaining nut extending into said disk for holding the head therein, a stud upon said disk, a resilient disk upon the stud, and means for clamping the disks together.

2. A valve comprising a casing having a smooth straight bore therein, a lid detachably secured upon one end of the casing, a tubular lining insertible into said bore from one end and toward the lid, a tubular valve seat insertible into the lining at that end thereof farthest removed from the lid, said seat having an annular flange constituting an abutment for the lining, and a flat ring clamped against the casing and lapping the flanged end of the valve seat to retain said seat and the lining within the casing.

In testimony that I claim the foregoing as my own, I have hereto affixed my signature in the presence of two witnesses.

ISAAC K. BEAVER

Witnesses:
 FRANK MEIKRANTZ,
 T. E. SNYDER.